(12) United States Patent
Giolito et al.

(10) Patent No.: US 12,430,773 B2
(45) Date of Patent: Sep. 30, 2025

(54) SYSTEM FOR DETECTING THE PATH OF MOVING OBJECTS

(71) Applicant: Aldoria, Cergy Pontoise (FR)

(72) Inventors: Damien Giolito, Paris (FR); Romain Lucken, Paris (FR)

(73) Assignee: Aldoria, Cergy-Pontoise (FR)

( * ) Notice: Subject to any disclaimer, the term of this patent is extended or adjusted under 35 U.S.C. 154(b) by 320 days.

(21) Appl. No.: 18/247,793

(22) PCT Filed: Aug. 27, 2021

(86) PCT No.: PCT/FR2021/051495
§ 371 (c)(1),
(2) Date: Apr. 4, 2023

(87) PCT Pub. No.: WO2022/074306
PCT Pub. Date: Apr. 14, 2022

(65) Prior Publication Data
US 2023/0419506 A1 Dec. 28, 2023

(30) Foreign Application Priority Data
Oct. 5, 2020 (FR) ....................... 2010136

(51) Int. Cl.
*G06T 7/215* (2017.01)
*G02B 23/00* (2006.01)
(Continued)

(52) U.S. Cl.
CPC ............. *G06T 7/215* (2017.01); *G02B 23/00* (2013.01); *G06T 7/11* (2017.01); *G06T 7/70* (2017.01);
(Continued)

(58) Field of Classification Search
CPC ........... G06T 7/215; G06T 2207/30241; G06T 7/246; G06T 7/70; G06T 7/11;
(Continued)

(56) References Cited

U.S. PATENT DOCUMENTS

| 1,751,649 | A | * | 3/1930 | Nieman | .................... F41G 5/08 235/405 |
| 2,658,277 | A | * | 11/1953 | Davis | ..................... G01C 21/18 235/407 |
| 2012/0274937 | A1 | * | 11/2012 | Hays | ....................... G01S 17/95 356/450 |

FOREIGN PATENT DOCUMENTS

| FR | 2962411 A1 | 1/2012 |
| FR | 2962556 A1 | 1/2012 |

(Continued)

OTHER PUBLICATIONS

Search machine translation of IDS cited FR 3018612 A1 to Michel, Method for Optically Detecting Space Mobiles, Telescope Systems for Detecting Space Mobiles, translated Jun. 8, 2025, 16 pages. (Year: 2025).*

(Continued)

*Primary Examiner* — Henok Shiferaw
*Assistant Examiner* — Dennis Rosario
(74) *Attorney, Agent, or Firm* — TraskBritt

(57) ABSTRACT

A system for detecting the path of moving objects comprises: —A first network of N1 telescopes each having a field angle of M1 degrees and orientated to cover an arc of C° in a plane P1, M1 being between 1 and 4°, N1 being greater than C/M1, the observation angles ALPHAN1 of each of the telescopes being in a plane P1, —at least one second network of N2 telescopes each having a field angle of M2 degrees and orientated to cover an arc of C° in a plane P2, M2 being between 1 and 4°, N2 being greater than C/M1, the observation angles ALPHAN1 of each of the (Continued)

telescopes being in a plane P2 perpendicular to P1 comprising the observation axis of the stellar reference object, —the orientation of the telescopes being controlled to maintain the intersection between the planes P1 and P2 in the axis of a reference object, —at least a third network of N3 telescopes each having a field angle of at least M3 degrees and orientated to cover a conical segment of 360° with an elevation E3 between (180−C)/2°, M3 being between 1 and 4°, N3 being greater than 360/M3, —each of the telescopes being provided with a photosensitive sensor that periodically supplies an image I.

8 Claims, 1 Drawing Sheet

(51) Int. Cl.
  *G06T 7/11* (2017.01)
  *G06T 7/70* (2017.01)
  *H04N 23/55* (2023.01)
  *H04N 23/69* (2023.01)
  *H04N 23/698* (2023.01)

(52) U.S. Cl.
  CPC ............ *H04N 23/55* (2023.01); *H04N 23/69* (2023.01); *H04N 23/698* (2023.01); *G06T 2207/30241* (2013.01)

(58) Field of Classification Search
  CPC .. G06T 7/13; G06T 7/12; G06T 7/194; G06T 7/20; G06T 2207/10032; G06V 20/52; B64G 3/00; B64G 1/369; B64G 1/1057; B64G 1/242; G01C 11/02; G01C 3/04; G01C 21/02; G02B 23/00; G02B 23/16; G02B 23/2484; G02B 23/2407; G02B 15/12; F41G 1/38; G01B 9/06; H04N 23/55; H04N 23/69; H04N 23/695; H04N 23/698
  See application file for complete search history.

(56) References Cited

FOREIGN PATENT DOCUMENTS

| | | |
|---|---|---|
| FR | 3018612 A1 | 9/2015 |
| WO | 2012/007361 A1 | 1/2012 |

OTHER PUBLICATIONS

International Search Report for International Application No. PCT/FR2021/051495 dated Dec. 13, 2021, 2 pages.
International Written Opinion for International Application No. PCT/FR2021/051495 dated Dec. 13, 2021, 6 pages.

* cited by examiner

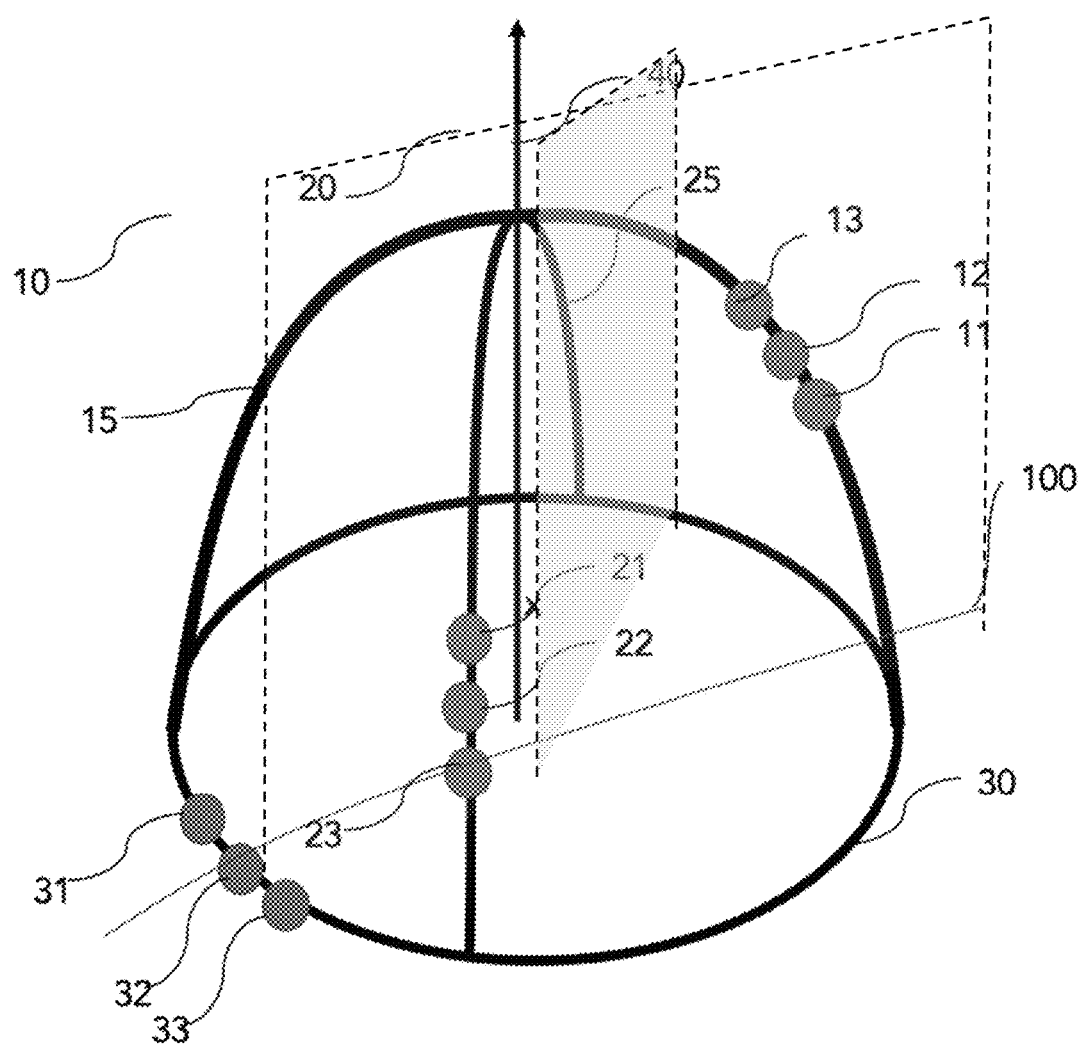

SYSTEM FOR DETECTING THE PATH OF MOVING OBJECTS

CROSS-REFERENCE TO RELATED APPLICATIONS

This application is a national phase entry under 35 U.S.C. § 371 of International Patent Application PCT/FR2021/051495, filed Aug. 27, 2021, designating the United States of America and published as International Patent Publication WO 2022/074306 A1 on Apr. 14, 2022, which claims the benefit under Article 8 of the Patent Cooperation Treaty to French Patent Application Serial No. FR2010136, filed Oct. 5, 2020.

TECHNICAL FIELD

The field of the present disclosure relates to the detection of moving objects present in space at low and high altitudes by optical methods implementing a set of telescopes. More particularly, the field of the present disclosure relates to the detection of satellites and space debris as well as aircraft or any moving object and the calculation of their orbit and path in order to prevent them from falling to Earth, colliding in space, or entering a dangerous zone.

BACKGROUND

The detection of orbital debris is very problematic. In fact, following an object whose size can be less than ten centimeters, to several thousand kilometers of distance is an arduous task.

Furthermore, as the objects have paths that are very different from one another, it is very difficult for economic reasons to cover the entire sky with the appropriate detection capabilities.

The ESA (European Space Agency) has estimated the number of objects such as inactive satellites, remnants of space missions such as rocket nose-cones, for example, rocket bodies, and small fragments to be:
  5,400 objects of space debris larger than one meter,
  34,000 objects of space debris larger than 10 centimeters,
  900,000 objects of space debris larger than one centimeter, and
  130,000,000 objects of space debris larger than one millimeter.

Currently, monitoring near space and, in particular, objects presenting a potential danger, whether natural or artificial, has become a major problem in ensuring the safety and integrity of any target that could be subjected to a collision.

This monitoring relates both to satellites that are at the end of life or uncontrolled, and to debris coming from previous collisions, or asteroids or comets that are potentially dangerous to the Earth.

Space agencies and private operators have developed various monitoring programs grouped under the name "Space Situational Awareness."

Even in the case where a meteorite is of relatively small size, the risks induced by a fall remain high. There is therefore a danger to people and infrastructure on the surface of the Earth from any falling moving object, the fragmentation of which in the atmosphere may cause significant damage. One of the problems encountered is the counting of small bodies of the solar system whose orbit intersects that of the Earth and tracking them in order to evaluate their dangerousness.

Artificial objects are found more and more in low or high orbits. Space seems to become more crowded every year, due to the presence of increasingly numerous satellites, and to the proliferation of catastrophic collisions resulting in an increase in the number of debris. Failure to track their path after their end of life, or to do so adequately, remains an increasing problem.

Projections are forecasting a situation in which an increase in the population of debris of size greater than 1 cm will make it harder to control and monitor such debris. The threshold of 1 cm corresponds to the size of an object that could potentially render a satellite wholly or partially inoperative, due to the speeds involved: 3 km/s in geostationary orbit to 8 km/s in low orbit.

These objects will be called "debris" in the rest of the text, with the understanding that this notion of debris encompasses actual debris, satellites whether operational or not, or even meteorites.

A first problem concerns the fall of debris toward the surface of the Earth and a second problem concerns the collision of debris, either between them or with active satellites. Monitoring the debris in space, and more particularly in low orbits, makes it possible to prevent these two consequences.

Finally, the problem of monitoring different moving objects in space also relates, by extension, to monitoring discrete moving objects traveling at very low altitude such as aircraft, for example, ultralight aircraft or drones, which can pose a hazard, for example, when their flight path goes near a sensitive site, for example, a nuclear power plant.

One difficulty is to find a wide-field optical system making it possible to cover different altitudes, both distant and close, and to follow objects at low altitudes moving at high speeds that make them difficult to detect.

Indeed, one problem of the detection and monitoring of space debris, whose orbit and/or path is not known, is the consideration of the intensity of light from third-party sources that interferes with detection.

These sources may originate from the sky, the sun, the moon and the local weather conditions that alter the stability of the exposure conditions. The monitoring system must be able to take into account a multitude of luminosity conditions making it possible to maximize detections in all circumstances. As the detection takes place by considering a point or an area on the surface of the globe, the condition of the field of view of the observer is an extremely important piece of data in calculating the probability of detecting a moving object and in calculating its path.

The problem of debris monitoring concerns various orbits to be taken into account in the methods for detecting moving objects in space. As regards natural objects such as meteorites, their orbit is generally heliocentric, which means that the meteorites can potentially approach the Earth at any altitude and from any direction. As regards artificial objects, their Earth orbit can be classified into different families of orbits.

The first family of orbits is known under the acronym LEO, for "Low Earth Orbit." This is a family of low orbits ranging up to 2000 km. This family of orbits is commonly used by satellites for communications, military, detection, weather, etc.

A second family of orbits is known by the acronym GEO, for "Geostationary Orbit," which is defined as being 35784 km above the equator. One revolution of a moving object at this altitude is 24 h. The moving object being located in a geostationary orbit is fixed relative to a terrestrial position. However, debris can leave their orbit and have non-geostationary orbits. This orbit is commonly used by satellites for communication (military or civilian), remote detection, weather, etc.

A third family of orbits is better known by the acronym MEO, designating "Medium Earth Orbit," which is a family of medium-level orbits, generally elliptical. This family includes GNSS satellites.

A fourth family of orbits is designated by the acronym HEO, including very elliptical orbits such as, for example, Molniya or Tundra orbits, which make it possible to communicate or monitor the regions of high latitudes.

A fifth family of orbits is designated by the acronym GTO meaning "Geostationary Transfer Orbit." This family comprises elliptical orbits. Their apogee is on the order of 42,000 km and their perigee is of the order of 650 km. This family of orbits is very practical for injecting satellites into geostationary orbit; it is therefore used during satellite launch operations as a transitional orbit for a geostationary orbit setting.

Different methods currently exist for detecting space debris and their paths.

In particular, there is a family of methods called "active methods," commonly used for the detection of debris in LEO orbits. The active methods rely on radar-type functioning wherein a moving object is illuminated by a source emitting a signal. The signal is then reflected and it is the reflection of the signal that informs a receiver of position data of the moving object.

A first drawback of this method is that the received power varies as $1/d^4$, where "d" is the distance from the moving object to the transmitter/receiver. Consequently, the received signal will remain low during detection, even if a high transmission power is employed.

A second drawback is the relatively large radar system installation required for this method. These installations are expensive and require considerable maintenance and are easily detectable. Furthermore, these systems consume a lot of energy and must consequently be installed near an electrical grid.

Active methods also include LIDARs, which rely on an illumination of a moving object by a laser. This method makes it possible to achieve better results than those of radar in terms of detected power since the laser light is better-focused. On the other hand, the detection cones are much smaller and are not very suitable for "blind" detections of moving objects in low and elliptical orbits. Another family of methods exists, which is passive methods in which the targets are not illuminated by a terrestrial source. As regards passive methods, the light flux captured by a detector varies with the distance "d" to the moving object as a function of $1/d''^2$, which offers better results than the active methods on the captured light flux coming from the moving object. On the other hand, the major drawback is the heavy dependence on illumination from external sources such as the sun, the stars or the moon. The advantage of these solutions lies in their low costs and in the relative simplicity of their implementation from detectors based on optical instruments capable of viewing small objects at all altitudes.

As regards moving objects in geostationary orbit, a telescope or a radar or any other electromagnetic means may detect an immobile point against a backdrop of moving stars during the time of installation. With a wide-field telescope, it is then possible to detect moving objects in space on a geostationary belt as well as their path.

In the case of the other orbits, called "polar" and therefore non-geostationary, that is to say not fixed with respect to an observation point on Earth, it is difficult to detect moving objects in space, their height, their inclination, and their orbital nodes, including the ascending and descending nodes.

One difficulty comes from the orbital speed of the moving objects in space, which may exceed 1°/s at the zenith for a low orbit. Detection is done by capturing a trace (on a sequence of images) vis-à-vis point traces or trails as a function of sidereal movement and therefore of the observation window in the sky.

The method then involves telling apart the traces, in order to detect the presence of a space debris. Although inclination may possibly be detected as a function of the analysis of the trace left by the moving object, it nonetheless remains very difficult to obtain a real speed of movement for the moving object due to its altitude not being known. Consequently, it is difficult to deduce elements from its path by extrapolating the analyses of the traces. In the general case, it is necessary to have three angular position measurements of the moving object to derive its orbit. Two measurements are sufficient if the moving object is in a circular orbit.

The problem can be solved by increasing the field of a telescope in order to increase the traces and their number, but the images detected, as explained previously, can become difficult to analyze due to the complexity of the telescopes to be implemented, surrounding light pollution, strong confusion caused by all the objects of the field, and the very large size of the necessary sensors.

Furthermore, the construction of a wide-field telescope is hardly conceivable beyond a few degrees, unlike photographic lenses.

Indeed, a wide-field optic makes it possible to deduce information regarding the path of the moving object; however, a wide field is more likely to be affected by parasitic light sources. Furthermore, it remains very difficult to design wide-field telescopes without encountering design problems, of specific optical circuit complexity. The presence of a wide focal plane also leads to numerous aberrations. When an electronic detector is coupled to a wide-field optic, it must be of very large size; the sizes and the number of pixels may be very high, the design costs are substantial, and operation is difficult.

There are telescope systems that make it possible to obtain a very large field by coupling a matrix of wide-field telescopes forming a single field as proposed by the company ASTRIUM, in particular, with the solution described in patent document WO 2012/007361. This patent describes an optical system for a space monitoring system characterized in that it comprises a matrix of N×P telescopes each with a field of greater than or equal to 5° and preferably greater than or equal to 10°, the telescopes being coupled to N×P sensitivity image sensors adapted to an integration time on the order of magnitude of 10 to 100 milliseconds, the telescopes being mounted on one or more motorized mounts, the telescopes being slaved together and grouped together so as to operate simultaneously to offer a wide field and in that the speed of movement of the telescope mounts is such that each object passing through the scanned zone is detected at least three times so as to obtain at least 3 dated position measurements distributed across the transit arc of the object in the sky, the pose time or integration time being defined in order to obtain a spread of the signal over several pixels.

One drawback of this solution is the cost of such a system that requires numerous telescopes with a very wide field. One solution is to reduce the number of telescopes and to associate a motorized tracking system with wider-field telescopes having at least one field of 5°, and in practice 14° in the example cited in the patent document (10°×10° on the square detector).

Patent FR2962556 describes an optical system for a monitoring system for a space monitoring system characterized in that it comprises at least one field telescope greater than or equal to 5° and preferably greater than or equal to 10° mounted on a mount movable along two axes, the telescope being coupled to a sensitivity image sensor adapted to an integration time on the order of magnitude of one millisecond.

This solution requires the use of wide-field telescopes whose magnification is modest and insufficient to take into account moving objects of very small size.

Patent FR2962411 proposes another solution for the space monitoring system in LEO areas of Earth orbit comprising a step of arranging and networking stations of monitoring optical systems on the surface of the globe into a mesh adapted to offer a daily effective cycle of the 24 h system and a chosen revisit duration of the observed LEO area, where for the mesh a latitude positioning of the optical systems according to preferred latitudes is defined from the orbit types to be monitored, and the following are provided:
  high-latitudes sites>50° North or South,
  medium-latitude sites between 30° and 50° North or South,
  low-latitude sites<30° close to the tropical and subtropical,
  a selection sites offering a longitude spacing of 20° or less.

The positioning and networking of the optical monitoring systems on the surface of the globe is achieved according to the following steps:
  a longitude positioning of the optical systems is defined from a calculation by means of a computer of the revisit times of each point of the globe,
  the arrangement of the optical systems is optimized according to a computer analysis of statistical conditions at the intersections of the latitudes and longitudes in order to obtain a maximum revisit duration of the system at most equal to one week,
  the optical systems are placed at the nodes of the mesh constituted according to the latitude and longitude positions according to a pitch adapted to respect the maximum revisit duration.

French patent FR3018612 describes another known solution for detecting a moving object in space, characterized in that it comprises:
  generating a plurality of fields of view (Zkp) by means of a first set of telescopes (T), each telescope defining a detection telescope, the set of fields (FOV) of each telescope (Ty) having a spatial distribution in at least one plane of the space inscribed in an open geometric shape (CC), the open geometric shape (CC) defining a wide detection field;
  detecting at least one trace of a moving object (M-i) in the field (FOVy) of at least one telescope (Ty) by an electronic detector coupled to each telescope (Ty), the integration time of the electronic detector being defined in order to obtain a spread of the trace across several pixels of the electronic detector for a given maximum orbital speed (VM) of a moving object and a minimum altitude of its orbit;
  deducting a path (TJSAT) of the moving object (M-i) in the image plane of the telescope (Ty).

BRIEF SUMMARY

In order to manage these risks, it is essential to catalog the set of potentially dangerous debris and to associate it with valid orbital parameters that make it possible to describe their paths. Observed from a fixed point on the Earth, the objects in low orbit are characterized in that they move rapidly across the sky. Furthermore, at each instant a plurality of objects pass through the sky in a plurality of places. According to its orbital parameters each object passes through the local sky at more or less regular time intervals, ranging from a few tens of minutes to several hours.

For this purpose, the present disclosure relates in its most general sense to a system for detecting the path (100) of moving objects characterized in that it includes:
  A first network of N1 telescopes that each have a field angle of M1 degrees and are orientated to cover an arc of C° in a plane P1, M1 being between 1 and 4°, N1 being greater than C/M1, the observation angles ALPHAN1 of each of the telescopes being in a plane P1;
  At least a second network of N2 telescopes that each have a field angle of M2 degrees and are orientated to cover an arc of C° in a plane P2, M2 being between 1 and 4°, N2 being greater than C/M1, the observation angles ALPHAN1 of each of the telescopes being in a plane P2 perpendicular to P1 comprising the observation axis of the stellar reference object;
  The orientation of the telescopes being controlled to maintain the intersection between planes P1 and P2 in the axis of a reference object;
  At least a third network of N3 telescopes that each have a field angle of at least M3 degrees and are orientated to cover a conical segment of 360° with an elevation E3 between (180−C)/2°, M3 being between 1 and 4°, N3 being greater than 360/M3;
  Each of the telescopes being provided with a photosensitive sensor that periodically supplies an image I; and
  The system further comprising a computer executing;
    for each of the images I a recognition processing of the coordinates of a segment $S_i$ (T, H, C) corresponding to a movement of an object in the corresponding telescope field T, where the variable H designates the time stamp of the image and C denotes the coordinates of the segment in the image; and
    processing applied to all of the recorded segments in order to estimate the paths of the objects.

BRIEF DESCRIPTION OF THE DRAWINGS

The present disclosure will be better understood from reading the following description, which relates to a non-limiting example embodiment illustrated by the appended drawings, in which:

FIG. 1 shows a perspective view of an installation according to the present disclosure.

DETAILED DESCRIPTION

Layout of Telescopes

FIG. 1 shows a schematic view of the layout of the telescopes.

The present disclosure implements a plurality of telescopes on a suitable geographical site, meeting criteria conducive to star observation:
  arid climate guaranteeing low cloud cover,
  altitude allows reduced atmospheric agitation,
  proximity of the sea to ensure minimal thermal difference between the ground and atmosphere, and geographical isolation so as not to be disrupted by human activities, especially with regard to lights and clouds of pollution.

The telescopes have a large field of view, about 3° to allow observation at a solid angle on the order of 10 square degrees. This is, for example, a Schmidt telescope. Each telescope is equipped with a photosensitive sensor, for example, an accumulation sensor having a pixel array making it possible to measure the number of pixels accumulated on each pixel during an acquisition period.

The telescopes are distributed between three networks, two networks in two perpendicular planes (10, 20) whose intersection defines a reference direction (40) forming a zenith angle ALPHA. The telescopes of the first network (11 to 13) and of the second network (21 to 23) are distributed to cover the entirety of two arcs (15, 25) extending over about 120°, the lowest parts on either side of the reference direction (40) being made up of a mask extending over about thirty degrees.

The third network is formed of a series of telescopes (31 to 33) observing an azimuth circle (30).

The reference direction (40) makes it possible to ensure the immobility of the stellar objects. This reference direction (40) may be modified episodically, the telescopes then being realigned according to the new reference direction (40). This telescope architecture makes it possible to determine the paths of the objects without covering the celestial segment.

The paths are established by measuring the image drag established by the intersection of the object with one of the three telescope networks.

The invention claimed is:

1. A system for detecting the path of moving objects comprises:
   a first network of N1 telescopes each having a field angle of M1 degrees and orientated to cover an arc of C° in a plane P1, M1 being between 1 and 4°, N1 being greater than C/M1, observation angles ALPHAN1 of each of the telescopes being in the plane P1;
   at least a second network of N2 telescopes each having a field angle of M2 degrees and orientated to cover an arc of C° in a plane P2, M2 being between 1 and 4°, N2 being greater than C/M1, the observation angles ALPHAN1 of each of the telescopes being in the plane P2 perpendicular to P1 comprising the observation axis of a reference stellar object, the orientation of the telescopes being controlled to maintain the intersection between the planes P1 and P2 in the axis of a reference object;
   a third network of N3 telescopes each having a field angle of M3 degrees and are orientated to cover a conical segment of 360°;
   wherein each of the telescopes is provided with a photosensitive sensor that periodically supplies an image I; and
   wherein the system further comprises a computer executing:
      for each of the images I, a recognition processing of the coordinates of a segment Si (T, H, C) corresponding to a movement of an object in the corresponding telescope field T, where the variable H designates a time stamp of the image and C denotes coordinates of the segment in the image; and
      processing applied to all of the recorded segments to estimate the paths of the objects.

2. The system of claim 1, wherein the third network comprises N3 telescopes each having a field angle of M3 degrees and orientated to cover a conical segment of 360° with an elevation E3 of ((180−C)/2)°, M3 being between 1 and 4°, N3 being greater than 360/M3.

3. The system of claim 2, wherein the paths are established by measuring image drag established by the intersection of the object with one of the three telescope networks.

4. The system of claim 2, wherein the telescopes are Schmidt telescopes.

5. The system of claim 2, wherein the telescopes are distributed between three networks, two networks in two perpendicular planes, the intersection of which defines a reference direction forming a zenith angle ALPHA, the telescopes of the first network and of the second network are distributed to cover the entirety of two arcs extending over about 120°, the lowest parts on either side of the reference direction being made up of a mask extending over about thirty degrees.

6. The system of claim 2, wherein the third network is formed of a series of telescopes observing an azimuth circle.

7. The system of claim 1, wherein the paths are established by measuring image drag established by the intersection of the object with one of the three telescope networks.

8. The system of claim 1, wherein the telescopes are Schmidt telescopes.

* * * * *